(12) United States Patent
Brumleve

(10) Patent No.: US 11,361,563 B2
(45) Date of Patent: Jun. 14, 2022

(54) AUDIO-VISUAL SIMULATION-GENERATING NEURAL NETWORK SYSTEM

(71) Applicant: Jacob Daniel Brumleve, Champaign, IL (US)

(72) Inventor: Jacob Daniel Brumleve, Champaign, IL (US)

( * ) Notice: Subject to any disclaimer, the term of this patent is extended or adjusted under 35 U.S.C. 154(b) by 51 days.

(21) Appl. No.: 17/103,336

(22) Filed: Nov. 24, 2020

(65) Prior Publication Data
US 2021/0158109 A1 May 27, 2021

Related U.S. Application Data

(60) Provisional application No. 62/939,900, filed on Nov. 25, 2019.

(51) Int. Cl.
*G06V 30/194* (2022.01)

(52) U.S. Cl.
CPC ................... *G06V 30/194* (2022.01)

(58) Field of Classification Search
CPC ...... G06V 30/194; G06V 10/26; G06V 10/82; G06K 9/6256; G06K 9/6271

USPC ......................................................... 382/156
See application file for complete search history.

(56) References Cited

U.S. PATENT DOCUMENTS

| 2017/0011257 | A1* | 1/2017 | Mikhael | G06V 10/52 |
| 2019/0050632 | A1* | 2/2019 | Weng | G06K 9/6267 |

* cited by examiner

*Primary Examiner* — Neil R McLean
(74) *Attorney, Agent, or Firm* — Singleton Law Firm, P.C.

(57) ABSTRACT

Embodiments of the present invention provide a system of interconnected neural networks capable audio-visual simulation generation by interpreting and processing a first image and, utilizing a given reference image or training set, modifying the first image such that the new image possesses parameters found within the reference image or training set. The images used and generated may include video. The system includes an autoposer, an automasker, an encoder, a generator, an improver, a discriminator, styler, and at least one training set of images or video. The system can also generate training sets for use within.

8 Claims, 7 Drawing Sheets

AUDIO-VISUAL SIMULATION-GENERATING NEURAL NETWORK SYSTEM

CROSS-REFERENCE TO RELATED APPLICATIONS

The present application claims the benefit of U.S. Provisional Application No. 62/939,900, filed Nov. 25, 2019, titled "Audio-Visual Simulation-Generating Neural Network System," which is hereby incorporated by reference in its entirety.

BRIEF DESCRIPTION OF THE INVENTION

Embodiments of the invention present a system of neural networks configured for audio-visual simulation and generation. The system is capable of interpreting and processing a first image and, utilizing a given reference image or training set, modifying the first image such that the new image possesses parameters found within the reference image or training set. The system may be configured to vary the degree to which the reference image or training set contributes to the new image. The first image or the reference image or training set may also comprise a video, or set of images, wherein the new image is also a video. A reference image or training set may also be combined with a first video, resulting in a new image comprising a video having parameters found within the reference image or training set. The system may also generate training sets for use within.

The system comprises a number of interconnected neural networks. Each neural network of the invention is a feed-forward sigmoid-activated multilayer perceptron network. The interconnected neural networks include an autoposer, an automasker, an encoder, a generator, an improver, and a discriminator. The system also comprises a styler having a mean vector and a matrix, configured for vector manipulation.

Training processes of the system comprise a stochastic optimization algorithm configured to optimize functions of each of the neural networks and the functions of the system. Each neural network of the system further comprises a network topology based on randomized layouts and a predetermined set of layer wiring rules. The network topology is configured to reduce hyperparameters and output artifacts. Layers of each of the neural networks are further configured to be locally connected in order to avoid instances of redundant feeding of nodes between layers of the neural network. Instances reflective connectivity may occur, in which one or more wires of a layer may cross vertical centerline to an opposite point node of another layer. Reflective connectivity typically occurs where a presented image or object possesses bilateral symmetry. The encoder and generator of the system may utilize reflective connectivity to increase efficiency and object representation.

Training processes of the encoder, generator, automasker, and autoposer may further comprise providing a neural network with a training set made up of a combination of samples and reflected symmetrical samples to increase learning by the neural networks.

The autoposer of the system is configured to take an input image of rigid or mostly rigid objects and output location information of the objects within the image. The autoposer is further configured to normalize images prior to processing by the encoder, by adjusting location information for objects to within a given range or value, also known as pose-estimation. The autoposer may also be configured as a fine poser or a rough poser, wherein the fine poser is configured to minimize distortion of objects of the input image; while the rough poser is configured to locate objects in a wider area with some potential for added distortion of said object.

The automasker is configured to take an input image that has been posed by the autoposer and maps the image onto a grayscale foreground mask or a background mask. Through trained segmentation, the automasker is capable of determining foreground objects or objects of interest within the image and distinguishing between the objects and the background of the image, after which the background or the objects is modified separately from the other.

The encoder is configured to receive an input image from either the autoposer or the automasker and output a control vector for the image. The encoder may also be configured to function as a class-specific compression algorithm, wherein the resultant vector is stored. The encoder is configured to work in tandem with the generator to reduce reconstruction error of the input image, such that it can be lossily reconstructed; that is, the image is irreversibly compressed but may be uncompressed by inexact approximations with minimal data loss.

The generator is configured to receive an input consisting of the control vector produced by the encoder, a reference sketch of the image configured as a general map of the image, a set of hashable text tags, and a set of final pose parameters. The generator is then configured to output a generated image or new image. The generator may be further configured to utilize the set of final pose parameters to modify the image and correct for previous distortions of the image. The generator and encoder are configured to function in tandem but may be trained with varied or differing training image sets, resulting in differing output images from one image generation to another. Control vectors may also be modified between the encoder and the generator to produce variance in resulting simulated or generated images.

The improver is configured to take an input image from the generator and produces an altered image that has been modified based on a given loss function. The improver is configured to work in tandem with the discriminator. The discriminator is configured to take an input image and output a single output channel representing an overall quality value of the input image. The discriminator therefore provides the loss function that trains and is utilized the improver to maximize quality of the improver through back-propagation. The improver and discriminator are further trained simultaneously, with the discriminator trained by predetermined sample images and output images from the improver.

The styler comprises a mean vector and a matrix, computed as a Cholesky decomposition of a given covariance matrix of the control vectors of a given training set. The styler is configured to generate control vectors based on a specific training set control vectors, having the same means, variances, and correlations thereof. The styler is further configured to accept tags, resulting in implementation of a corresponding tag vector on the control vector. This then results in transformations of mean and variance values in the control vector. In some embodiments of the invention, transformations of mean and variance may be done with respect to a covariance of a given set. Doing so allows the styler to utilize tag vectors to effectively focus on relevant variances during identification and selection processes on a given image or control vector.

The methods, systems, and apparatuses are set forth in part in the description which follows, and in part will be obvious from the description, or can be learned by practice of the methods, apparatuses, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed. More details concerning these embodiments, and others, are further described in the following figures and detailed description set forth herein below.

DETAILED DESCRIPTION OF THE INVENTION

Figure 1A:
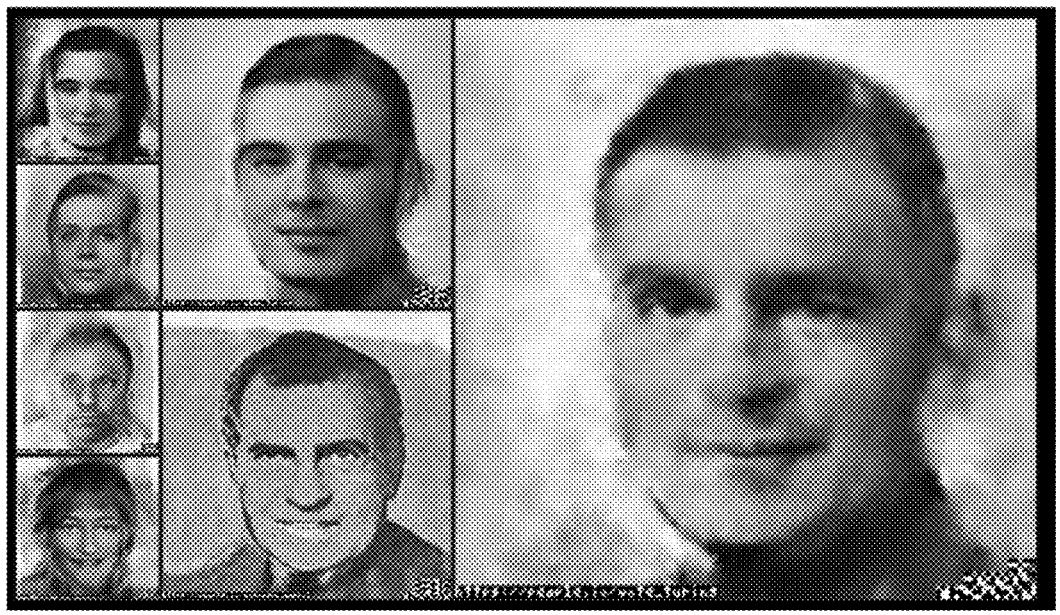
FIGS. 1A through 1F illustrate output results of different encoded and combined images produced by the invention.
Figure 1B:
Figure 1C:
Figure 1D:
Figure 1E:
Figure 1F:
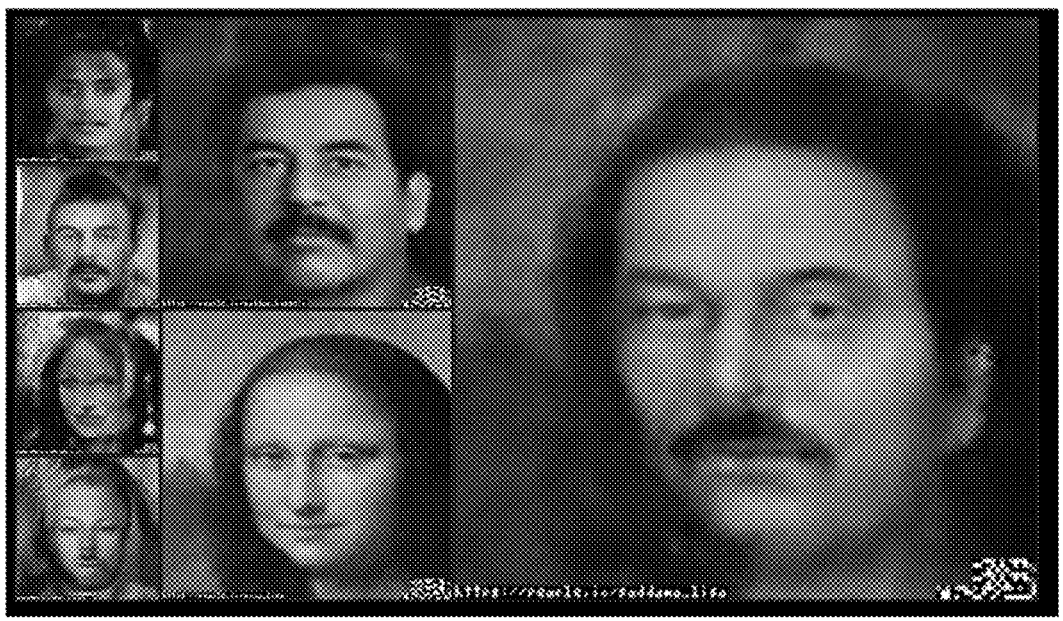
Figure 2A:
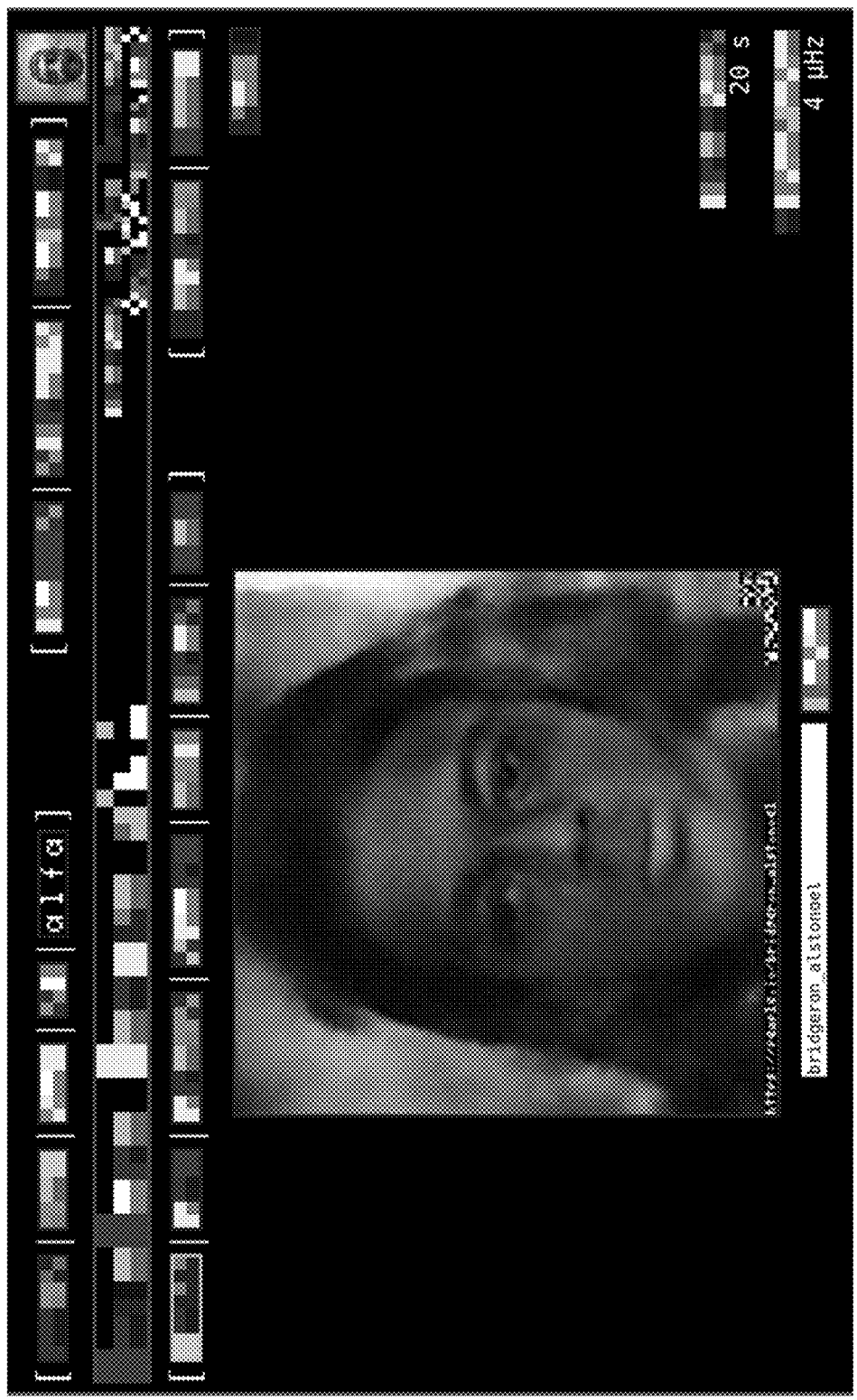
FIGS. 2A and 2B illustrates generated images produced by the invention from random input images with a covariance matching training set.
Figure 2B:
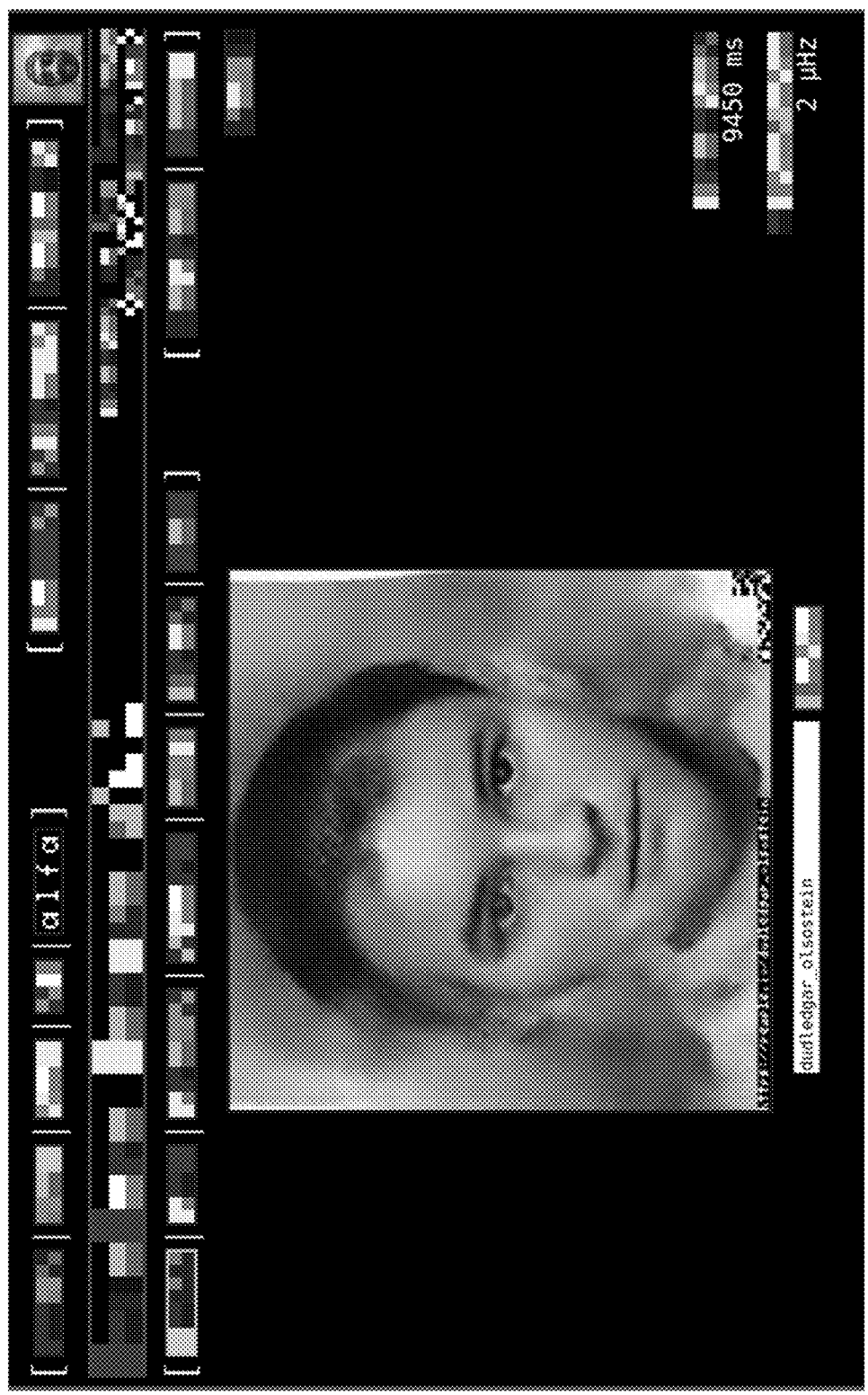
Figure 3A:
FIGS. 3A and 3B illustrates an embodiment of a user interface of the invention, specifically transformation and combination of input and/or generated images.
Figure 3B:

The present invention relates to neural networks, machine learning, and picture and video generation. Specifically, a system of neural networks configured for audio-visual simulation and generation. The system is capable of interpreting and processing a first image and, utilizing a given reference image or training set, modifying the first image such that the new image possesses parameters found within the reference image or training set. The system may be configured to vary the degree to which the reference image or training set contributes to the new image. The first image or the reference image or training set may also comprise a video, or set of images, wherein the new image is also a video. A reference image or training set may also be combined with a first video, resulting in a new image comprising a video having parameters found within the reference image or training set. The system may also generate training sets for use within.

The system comprises a number of interconnected neural networks. Each neural network of the invention is a feed-forward sigmoid-activated multilayer perceptron network. The interconnected neural networks include an autoposer, an automasker, an encoder, a generator, an improver, and a discriminator. The system also comprises a styler having a mean vector and a matrix, configured for vector manipulation.

Each of the neural networks of the system, and the styler, are capable of being trained by input of a training set comprised of a number of sample images. The sample images may comprise parameters or depictions of any characteristics that a user chooses. The training set is generally configured such that input of the training set through a given neural network will train said neural network to react to specific parameters common amongst the samples of the training set. The training set can be curated for each individual neural network or for the system as a whole in order to yield user-desired results.

Training processes of the system comprise a stochastic optimization algorithm configured to optimize functions of each of the neural networks and the functions of the system. Each neural network of the system further comprises a network topology based on randomized layouts and a predetermined set of layer wiring rules. The network topology is configured to reduce hyperparameters and output artifacts. Layers of each of the neural networks are further configured to be locally connected in order to avoid instances of redundant feeding of nodes between layers of the neural network. Instances reflective connectivity may occur, in which one or more wires of a layer may cross vertical centerline to an opposite point node of another layer. Reflective connectivity typically occurs where a presented image or object possesses bilateral symmetry. The encoder and generator of the system may utilize reflective connectivity to increase efficiency and object representation.

Training processes of the encoder, generator, automasker, and autoposer may further comprise providing a neural network with a training set made up of a combination of samples and reflected symmetrical samples to increase learning by the neural networks.

Each of the neural networks is also configured to generate synthetic training sets for each other neural network. For example, the autoposer can generate a training set with specific poses that is utilized by the automasker to train; the automasker can be used to modify or replace backgrounds of samples within a training set utilized by the autoposer; and the generator can generate synthetic objects and images for use in training sets for both the autoposer and the automasker. Inter-network generation of training sets allows training process to be carried out efficiently and requiring fewer initial user-provided samples. These techniques make it possible to train to the same accuracy with fewer real samples.

The autoposer of the system comprises five layers, starting with local connectivity and becoming dense near the output. The autoposer is configured to take an input image of rigid or mostly rigid objects and output landmark location information of the objects within the image, starting with the size of a given image and outputting coordinates for each landmark specified within the image. The autoposer is further configured to normalize images prior to processing by the encoder, by adjusting location information for objects to within a given range or value, also known as pose-estimation.

The autoposer is further configured to linearly warp images such that landmarks within the image are transformed to a standardized position. For example, for images of faces, the "standard pose" is configured such that eyes are level at specific points symmetrical about a center and a mouth is centered horizontally at a specific point beneath the eyes.

The autoposer may also be configured as a fine poser or a rough poser, wherein the fine poser is configured to minimize distortion of objects of the input image; while the rough poser is configured to locate objects in a wider area with some potential for added distortion of said object. One or both of the fine poser or rough poser may be utilized to process an image multiple times to increase accuracy of pose-estimation, specifically on outliers within the image.

The autoposer of the system comprises five layers, all of similar size, with only local connectivity. The automasker is configured to take an input image that has been posed by the autoposer and maps the image onto a grayscale foreground mask or a background mask. Through trained segmentation, the automasker is capable of determining foreground objects or objects of interest within the image and distinguishing between the objects and the background of the image, after which the background or the objects is modified separately from the other.

The encoder of the system comprises five layers, which begin locally connected and increasing in density until a final fully-connected control layer. The encoder is configured to receive an input image from either the autoposer or the automasker and output a control vector for the image. The encoder may also be configured to function as a class-specific compression algorithm, wherein the resultant vector is stored. The encoder is configured to work in tandem with the generator to reduce reconstruction error of the input image, such that it can be lossily reconstructed; that is, the image is irreversibly compressed but may be uncompressed by inexact approximations with minimal data loss.

The generator of the system comprises a shape nearly opposite to that of the encoder, having five layers of decreasing density. The generator is configured to receive an input consisting of the control vector produced by the encoder, a reference sketch of the image configured as a general map of the image, a set of hashable text tags, and a set of final pose parameters. The generator is then configured to output a generated image or new image. The generator may be further configured to utilize the set of final pose parameters to modify the image and correct for previous distortions of the image. The generator and encoder are configured to function in tandem but may be trained with varied or differing training image sets, resulting in differing output images from one image generation to another. Control vectors may also be modified between the encoder and the generator to produce variance in resulting simulated or generated images.

In some embodiments of the invention, an encoder and the generator may be trained to focus reconstruction processes on specific targets within an image, such as spatial areas. This is done by clustering control space samples of a training set for a given area. Next, a second encoder and a second generator may be trained on the clustered training set. Less variation within each cluster of the training set results in a more accurate reconstruction than an encoder and generator trained on a larger training set. Loss by the generator may then be focused to a center by using a paraboloid-type function, which doubles loss at the center and approaches zero away from the center. This effectively increases reconstruction accuracy in the center than at any edges or corners of an image, reserving more of the control space for those central details.

The improver of the system is configured to take an input image from the generator and produce an altered image that has been modified based on a given loss function. The improver is configured to work in tandem with the discriminator. The discriminator of the system, similar in configuration to the autoposer, is configured to receive an input image and output a single output channel representing an overall quality value of the input image. The discriminator therefore provides the loss function that trains and is utilized the improver to maximize quality of the improver through the process of backpropagation. The improver and discriminator are further trained simultaneously and against one another to form a generative adversarial network, wherein the discriminator is trained by predetermined sample images and output images from the improver.

In another embodiment, the generator and encoder may be configured to allow compression of video in the same manner described above, with the improver and the discriminator further configured to process a generated video from the generator and increase the quality of the video despite any loss from compression.

The styler of the system comprises a mean vector and a matrix, computed as a Cholesky decomposition of a given covariance matrix of the control vectors of a given training set, as received from the encoder. The styler is configured to generate control vectors based on a specific training set control vectors, having the same means, variances, and correlations thereof. The styler is further configured to accept tags, resulting in implementation of a corresponding tag vector on the control vector. This then results in transformations of mean and variance values in the control vector. While the styler is not a neural network, the function of the styler, namely the multiply-matrix-and-add-vector operation, can treated as a single, un-activated neural network layer. In some embodiments of the invention, transformations of mean and variance may be done with respect to a covariance of a given set. Doing so allows the styler to utilize tag vectors to effectively focus on relevant variances during identification and selection processes on a given image or control vector.

In another embodiment of the invention, the system may be configured to generate simulations, such as moving objects, video, and simulations of human beings. Simulations generated by the system may further be configured to react to pre-determined stimuli or input and then, through the function of the system and generated training sets, be modified to react to different or new stimuli or input, or modified to react differently to the same pre-determined stimuli or input.

In another embodiment, the autoposer may further be configured to generate and capture a training set from a video, thereby posing relative movements of objects within the video. The generated training set can then be used by the generator to train for a specific object, increasing reconstruction accuracy for said specific object.

Below is a partial example of computer-implemented code representing at least one implementation of the neural network of the invention.

```cpp
#ifndef __MAKEMORE_MEGATRON_HH__
define __MAKEMORE_MEGATRON_HH__ 1 include "tron.hh"
include "wiring.hh"

namespace makemore { extern double adam_b1, adam_b2, adam_b3, adam_eps;

struct Megatron : Tron {
  const double *in;
  double *fin, *out, *fout;

const class Wiring *wire;
  class Mapfile *mapfile;

unsigned int wn;
  unsigned int **iwmap, **owmap;
  unsigned int **iomap, **oimap;
  unsigned int *wimap, *womap;

double *weight;
  unsigned int *mapbuf;

double *m, *v;

unsigned int inrn, outrn;
  unsigned int mbn;

double eta;
```

```
  bool activated;

std::vector<std::vector<unsigned int> > _mow;

Megatron(const class Wiring *_wire, class Mapfile *_mapfile, unsigned
int _mbn = 1, double _eta = 1.0, bool _activated = true);
  virtual ~Megatron();

virtual const double *feed(const double *_in, double *_fin);
  virtual void train(double r);

virtual const double *output() { return out; }
  virtual const double *input() { return in; }
  virtual double *foutput() { return fout; } void _makemaps();
  void randomize(double disp);
};

} endif
------- define __MAKEMORE_SUPERTRON_CU__ 1 include <stdio.h>
include <assert.h> include <math.h> include <vector>
include <map> include "cudamem.hh"
include "random.hh"
#include "supertron.hh"
#include "mapfile.hh"
```

```
namespace makemore { inline __device__ int  shl(int a, int b) { return ((b < 0) ? (a >> -b) :
(a << b)); }
inline           int dshl(int a, int b) { return ((b < 0) ? (a >> -b) :
(a << b)); } inline __device__ int  shr(int a, int b) { return ((b < 0) ? (a << -b) :
(a >> b)); }
inline           int dshr(int a, int b) { return ((b < 0) ? (a << -b) :
(a >> b)); } inline __device__ bool dev_outi_to_ini_wi(const Supertron::Layer::Head*
head, int outi, int i, int *inip, int *wip)
#include "outi_to_ini_wi.hh"
inline __device__ bool dev_ini_to_outi_wi(const Supertron::Layer::Head*
head, int ini, int i, int *outip, int *wip)
#include "ini_to_outi_wi.hh"
inline __device__ bool dev_wi_to_ini_outi(const Supertron::Layer::Head*
head, int wi, int i, int *inip, int *outip)
#include "wi_to_ini_outi.hh"

inline __device__ int dev_get_oiwtabn(const Supertron::Layer::Head* head)
#include "get_oiwtabn.hh"
inline __device__ int dev_get_iowtabn(const Supertron::Layer::Head* head)
#include "get_iowtabn.hh"
inline __device__ int dev_get_wiotabn(const Supertron::Layer::Head* head)
#include "get_wiotabn.hh"

#define shr dshr
define shl dshl inline bool outi_to_ini_wi(const Supertron::Layer::Head* head, int outi,
int i, int *inip, int *wip)
#include "outi_to_ini_wi.hh"
```

```
inline bool ini_to_outi_wi(const Supertron::Layer::Head* head, int ini,
int i, int *outip, int *wip)
#include "ini_to_outi_wi.hh"
inline bool wi_to_ini_outi(const Supertron::Layer::Head* head, int wi,
int i, int *inip, int *outip)
#include "wi_to_ini_outi.hh"

inline int get_oiwtabn(const Supertron::Layer::Head* head)
#include "get_oiwtabn.hh"
inline int get_iowtabn(const Supertron::Layer::Head* head)
#include "get_iowtabn.hh"
inline int get_wiotabn(const Supertron::Layer::Head* head)
#include "get_wiotabn.hh"

__global__ void gpu_supertron_feed(
  Supertron::Layer layer
) {
  Supertron::Layer::Head *head = layer.head;
  int outn = head->outn;
  int outi = blockIdx.x * blockDim.x + threadIdx.x;
  if (outi >= outn)
    return;

double *weight = layer.weight;
  const double *in = layer.in;

double sum = 0;

if (head->type == Supertron::Layer::TYPE_MPOOL) {
    int tmp = outi;
    int oz = tmp % head->oc; tmp /= head->oc;
    int ox = tmp % head->ow; tmp /= head->ow;
    int oy = tmp;

if (head->s >= 0)
      return;
```

```
      int md = (1 << -head->s);
      int max_ini = -1;

for (int dy = 0; dy < md; ++dy) {
        for (int dx = 0; dx < md; ++dx) {
          int ix = dx + ox * md;
          int iy = dy + oy * md;
          int iz = oz;

int ini = iz + head->ic * (ix + head->iw * iy);
          if (max_ini < -1 || in[ini] > in[max_ini])
            max_ini = ini;
        }
      } sum = in[max_ini];
    } else if (int *oiwtab = layer.oiwtab) {
      unsigned int oiwtabn = dev_get_oiwtabn(head);

oiwtab += outi * oiwtabn * 2;
      for (int i = 0; i < oiwtabn; ++i, oiwtab += 2) {
        int ini = oiwtab[0];
        int wi = oiwtab[1];
        if (wi >= 0) {
          if (ini >= 0)
            sum += weight[wi] * in[ini];
          else if (ini == -1)
            sum += weight[wi];
        }
      }
    } else {
      int ini, wi;
      for (int i = 0; dev_outi_to_ini_wi(head, outi, i, &ini, &wi); ++i) {
        if (wi >= 0) {
          if (ini >= 0)
            sum += weight[wi] * in[ini];
          else if (ini == -1)
            sum += weight[wi];
```

```
      }
    }
  } switch (head->activated) {
  case Supertron::Layer::ACTIVATION_NONE:
    layer.out[outi] = sum;
    break;
  case Supertron::Layer::ACTIVATION_SIGMOID:
    layer.out[outi] = 1.0 / (1.0 + exp(-sum));
    break;
  case Supertron::Layer::ACTIVATION_RELU:
    layer.out[outi] = (sum > 0) ? sum : 0;
    break;
  case Supertron::Layer::ACTIVATION_SOFTPLUS:
    layer.out[outi] = (sum > 64) ? sum : log(1 + exp(sum));
    break;
  default:
    layer.out[outi] = 0;
    break;
  } layer.fout[outi] = 0.0;
}

__global__ void gpu_supertron_train0(
  Supertron::Layer layer, double a
) {
  Supertron::Layer::Head *head = layer.head;
  int outn = head->outn;
  int outi = blockIdx.x * blockDim.x + threadIdx.x;
  if (outi >= outn)
    return;

switch (head->activated) {
  case Supertron::Layer::ACTIVATION_NONE:
    break;
  case Supertron::Layer::ACTIVATION_SIGMOID:
```

```
    {
       double o = layer.out[outi];
       double fo = layer.fout[outi];

if (o > 1.0)
          o = 1.0;
       else if (o < 0.0)
          o = 0.0;

layer.fout[outi] = fo * o * (1.0 - o);
    }
    break;
  case Supertron::Layer::ACTIVATION_RELU:
    if (layer.out[outi] <= 0)
       layer.fout[outi] = 0;
    break;
  case Supertron::Layer::ACTIVATION_SOFTPLUS:
    layer.fout[outi] = layer.fout[outi] * (1 - exp(-layer.out[outi]));
    break;
  default:
    break;
  }
}

__global__ void gpu_supertron_train1(
  Supertron::Layer layer
) {
  Supertron::Layer::Head *head = layer.head;
  int inn = head->inn;
  unsigned int ini = blockIdx.x * blockDim.x + threadIdx.x;
  if (ini >= inn)
    return;

double sum = 0;
  int outi, wi;

double *weight = layer.weight;
```

```
double *fout = layer.fout;

if (head->type == Supertron::Layer::TYPE_MPOOL) {
  int tmp = ini;
  int iz = tmp % head->ic; tmp /= head->ic;
  int ix = tmp % head->iw; tmp /= head->iw;
  int iy = tmp;

if (head->s >= 0)
    return;
  int md = (1 << -head->s);

int oz = iz;
  int ox = ix / md;
  int oy = iy / md;

int max_inj = -1;

for (int dy = 0; dy < md; ++dy) {
    for (int dx = 0; dx < md; ++dx) {
      int jx = dx + ox * md;
      int jy = dy + oy * md;
      int jz = oz;

int inj = jz + head->ic * (jx + head->iw * jy);
      if (max_inj < -1 || layer.in[inj] > layer.in[max_inj])
        max_inj = inj;
    }
  } if (max_inj != ini)
    return;

int outi = oz + head->oc * (ox + head->ow * oy);
  layer.fin[ini] += layer.fout[outi];
  return;
}
```

```
    if (int *iowtab = layer.iowtab) {
      unsigned int iowtabn = dev_get_iowtabn(head);

iowtab += ini * iowtabn * 2;
      for (int i = 0; i < iowtabn; ++i, iowtab += 2) {
        outi = iowtab[0];
        wi = iowtab[1];

if (outi >= 0 && wi >= 0)
          sum += weight[wi] * fout[outi];
      }
    } else {
      for (int i = 0; dev_ini_to_outi_wi(head, ini, i, &outi, &wi); ++i) {
        if (outi >= 0 && wi >= 0)
          sum += weight[wi] * fout[outi];
      }
    } layer.fin[ini] += sum;
}

__global__ void gpu_supertron_train2(
  Supertron::Layer layer, double a
) {
  Supertron::Layer::Head *head = layer.head;
  int wn = head->wn;

if (head->type == Supertron::Layer::TYPE_MPOOL)
    return;
  if (a == 0)
    return;

unsigned int wi;
  int k;
  int i0, i1;
  unsigned int n = dev_get_wiotabn(head);
```

```
if (layer.wbufk) {
  int q = blockIdx.x * blockDim.x + threadIdx.x;
  wi = q % wn;
  k = q / wn;
  if (k >= layer.wbufk)
    return;

i0 = (k * n) / layer.wbufk;
  i1 = ((k + 1) * n) / layer.wbufk;
} else {
  wi = blockIdx.x * blockDim.x + threadIdx.x;
  if (wi >= wn)
    return;
  k = -1;
  i0 = 0;
  i1 = n;
} double *fout = layer.fout;
const double *in = layer.in;

double dw = 0;
int nw = 0;

if (int *wiotab = layer.wiotab) {
  unsigned int wiotabn = dev_get_wiotabn(head);

wiotab += wi * wiotabn * 2 + i0 * 2;

for (int i = i0; i < i1; ++i, wiotab += 2) {
    int ini = wiotab[0];
    int outi = wiotab[1];

if (outi >= 0 && ini != -2) {
      dw += fout[outi] * (ini == -1 ? 1.0 : in[ini]);
      ++nw;
    }
```

```
    }

} else {
    int ini, outi;

for (int i = i0; i < i1; ++i) {
      dev_wi_to_ini_outi(head, wi, i, &ini, &outi);
      if (outi >= 0 && ini != -2) {
        dw += fout[outi] * (ini == -1 ? 1.0 : in[ini]);
        ++nw;
      }
    }
  } if (layer.wbufk) {
    layer.wbuf[wi * layer.wbufk + k] = dw;

__syncthreads();

if (k)
      return;

double sdw = 0;
    for (k = 0; k < layer.wbufk; ++k)
      sdw += layer.wbuf[wi * layer.wbufk + k];
    dw = sdw;
  } if (nw > 1)
    dw /= (double)nw;

if (head->adam) {
    double adam_b1 = layer.head->adam_b1;
    double adam_b2 = layer.head->adam_b2;
    double adam_b3 = layer.head->adam_b3;
    double adam_eps = layer.head->adam_eps;

layer.m[wi] = adam_b1 * layer.m[wi] + (1.0 - adam_b1) * dw;
```

```
    layer.v[wi] = adam_b2 * layer.v[wi] + (1.0 - adam_b2) * dw * dw;
    layer.weight[wi] += a * layer.m[wi] / (pow(layer.v[wi], adam_b3) +
adam_eps);
  } else {
    layer.weight[wi] += a * dw;
  }
} const double *Supertron::feed(const double *_in, double *_fin) {
  assert(layers.size() > 0);

for (unsigned int li = 0; li < layers.size(); ++li) {
    Supertron::Layer &lay = *layers[li];

if (li > 0) {
      lay.in = layers[li - 1]->out;
      lay.fin = layers[li - 1]->fout;
    } else {
      lay.in = _in;
      lay.fin = _fin;
    } int bs = 256;
    int gs = (lay.outn + bs - 1) / bs;
//fprintf(stderr, "feeding layer %u\n", li);
    gpu_supertron_feed<<<gs, bs>>>(lay);
//fprintf(stderr, "    fed layer %u\n", li);

} return layers[layers.size() - 1]->out;
} void Supertron::target(const double *tgt) {
  assert(layers.size());
  Supertron::Layer *lay = layers[layers.size() - 1];
  cusubvec(tgt, lay->out, lay->outn, lay->fout);
}
```

```
void Supertron::update_stats() {
  assert(layers.size());
  Supertron::Layer *lay = layers[layers.size() - 1];

double z = pow(1.0 - errdecay, (double)rounds);

double nerr2 = sqrt(cusumsq(lay->fout, lay->outn) / (double)lay->outn);
//fprintf(stderr, "nerr2=%lf\n", nerr2);
  err2 *= (1.0 - z);
  err2 *= (1.0 - errdecay);
  err2 += errdecay * nerr2;
  err2 *= 1.0 / (1.0 - z * (1.0 - errdecay));

double nerrm = cumaxabs(lay->fout, lay->outn);
  errm *= (1.0 - z);
  errm *= (1.0 - errdecay);
  errm += errdecay * nerrm;
  errm *= 1.0 / (1.0 - z * (1.0 - errdecay));

++rounds;
} void Supertron::train(double nu) { for (auto li = layers.rbegin(); li != layers.rend(); ++li) {
    Supertron::Layer &lay = **li;

{
      int bs0 = 256;
      int gs0 = (lay.outn + bs0 - 1) / bs0;
      gpu_supertron_train0<<<gs0, bs0>>>(lay, nu);
    } if (lay.fin) {
      int bs1 = 256;
      int gs1 = (lay.inn + bs1 - 1) / bs1;
```

```
      gpu_supertron_train1<<<gs1, bs1>>>(lay);
    } if (lay.wbufk) {
      int bs2 = 256;
      int gs2 = (lay.wn * lay.wbufk + bs2 - 1) / bs2;
      gpu_supertron_train2<<<gs2, bs2>>>(lay, nu);
    } else {
      int bs2 = 256;
      int gs2 = (lay.wn + bs2 - 1) / bs2;
      gpu_supertron_train2<<<gs2, bs2>>>(lay, nu);
    }
  }
}

Supertron::Supertron(Mapfile *_mapfile) {
  inn = 0;
  outn = 0;
  err2 = 0;
  errm = 0;
  rounds = 0;
  errdecay = 0.01;

mapfile = _mapfile;

cumake(&cunlayers, 1);
  mapfile->map(cunlayers, 1);
  mapfile->load(cunlayers);

uint64_t nlayers;
  decude(cunlayers, 1, &nlayers);
  layers.resize(nlayers);

for (unsigned int i = 0; i < nlayers; ++i) {
    Supertron::Layer *lay = new Supertron::Layer;
    cumake(&lay->head, 1);
    mapfile->map(lay->head, 1);
```

```
mapfile->load(lay->head);

Supertron::Layer::Head head;
decude(lay->head, 1, &head);
lay->wn = head.wn;
lay->inn = head.inn;
lay->outn = head.outn;

cumake(&lay->out, head.outn);
cumake(&lay->fout, head.outn);

cumake(&lay->weight, head.wn);
mapfile->map(lay->weight, head.wn);
mapfile->load(lay->weight);

cumake(&lay->m, head.wn);
mapfile->map(lay->m, head.wn);
mapfile->load(lay->m);

cumake(&lay->v, head.wn);
mapfile->map(lay->v, head.wn);
mapfile->load(lay->v);

lay->iowtab = NULL;
lay->oiwtab = NULL;
lay->wiotab = NULL;

if (head.type == Supertron::Layer::TYPE_CONV) { unsigned int mwn = 16384;
  if (lay->wn < mwn) {
    lay->wbufk = 2 * mwn / lay->wn;
    if (lay->wbufk > 128)
      lay->wbufk = 128;
  } cumake(&lay->wbuf, lay->wn * lay->wbufk);
}
```

```
#if 0
    {
      unsigned int oiwtabn = get_oiwtabn(&head);
      cumake(&lay->oiwtab, oiwtabn * head.outn * 2);
      mapfile->map(lay->oiwtab, oiwtabn * head.outn * 2);
      mapfile->load(lay->oiwtab);
    }

{
      unsigned int iowtabn = get_iowtabn(&head);
      cumake(&lay->iowtab, iowtabn * head.inn * 2);
      mapfile->map(lay->iowtab, iowtabn * head.inn * 2);
      mapfile->load(lay->iowtab);
    }

{
      unsigned int wiotabn = get_wiotabn(&head);
      cumake(&lay->wiotab, wiotabn * head.wn * 2);
      mapfile->map(lay->wiotab, wiotabn * head.wn * 2);
      mapfile->load(lay->wiotab);
    }
endif layers[i] = lay;
    if (i > 0) {
fprintf(stderr, "i=%d\n", i);
      assert(layers[i - 1]->outn == layers[i]->inn);
}
  } if (nlayers) {
    inn = layers[0]->inn;
    outn = layers[layers.size() - 1]->outn;
  }
}
```

```
Supertron::~Supertron() {
  for (auto lay : layers) {
    cufree(lay->head);
    cufree(lay->out);
    cufree(lay->fout);
    cufree(lay->weight);
    cufree(lay->m);
    cufree(lay->v);
    delete lay;
  }
  if (cunlayers)
    cufree(cunlayers);
} void Supertron::add_layer(
    Supertron::Layer::Type type,
    unsigned int iw, unsigned int ih, unsigned int ic,
    unsigned int ow, unsigned int oh, unsigned int oc,
    unsigned int d, int s,
    Supertron::Layer::Activation activated
) {
  Supertron::Layer::Head head;

head.type = type;
  head.iw = iw;
  head.ih = ih;
  head.ic = ic;
  head.ow = ow;
  head.oh = oh;
  head.oc = oc;
  head.d = d;
  head.s = s;
  head.activated = activated;

head.inn = iw * ih * ic;
  head.outn = ow * oh * oc;

head.adam = true;
```

```
    head.adam_b1 = 0.9;
    head.adam_b2 = 0.999;
//  head.adam_b2 = 0.99;
    head.adam_b3 = 0.5;
    head.adam_eps = 1e-8;

int d21 = (d * 2 + 1);
    int m = (d21 * d21 * ic + 1);
    int s2 = (s > 0) ? (1 << s) : 1;

switch (head.type) {
    case Supertron::Layer::TYPE_FULL:
      head.wn = (head.inn + 1) * head.outn;
      assert(d == 0);
      assert(s == 0);
      break;

case Supertron::Layer::TYPE_LOCAL:
      head.wn = head.outn * m;
fprintf(stderr, "%d, %d, %d, %d\n", ow, iw, s, (iw>>-s));
      assert(ow == shl(iw, s));
      assert(oh == shl(ih, s));
      break;

case Supertron::Layer::TYPE_CONV:
      head.wn = s2 * s2 * head.oc * m;
      assert(ow == shl(iw, s));
      assert(oh == shl(ih, s));
      break;

case Supertron::Layer::TYPE_YCONV:
      head.wn = s2 * oc * ow * m;
//fprintf(stderr, "s=%d iw=%u ow=%u\n", s, iw, ow);
      assert(ow == shl(iw, s));
      assert(oh == shl(ih, s));
      break;

case Supertron::Layer::TYPE_MPOOL:
```

```
      head.wn = 1;
      assert(s < 0);
      assert(d == 0);
      assert(ow == shl(iw, s));
      assert(oh == shl(ih, s));
      break;

default:
      assert(0);
   } fprintf(stderr, "wn=%d\n", head.wn);

add_layer(head);
} void Supertron::add_layer(const Supertron::Layer::Head &head) {
   uint64_t nlayers = layers.size();
   if (nlayers) {
      Layer *ll = layers[nlayers - 1];
      assert(ll->outn == head.inn);
   }

++nlayers;
   encude(&nlayers, 1, cunlayers);

Supertron::Layer *lay = new Supertron::Layer;
   cumake(&lay->head, 1);
   mapfile->map(lay->head, 1);
   encude(&head, 1, lay->head);

cumake(&lay->out, head.outn);
   cumake(&lay->fout, head.outn);

cumake(&lay->weight, head.wn);
   mapfile->map(lay->weight, head.wn);
   cumake(&lay->m, head.wn);
   mapfile->map(lay->m, head.wn);
```

```
cumake(&lay->v, head.wn);
mapfile->map(lay->v, head.wn);

lay->wn = head.wn;
lay->inn = head.inn;
lay->outn = head.outn;

lay->iowtab = NULL;
lay->oiwtab = NULL;
lay->wiotab = NULL;

#if 0
  {
    unsigned int oiwtabn = get_oiwtabn(&head);
    cumake(&lay->oiwtab, oiwtabn * head.outn * 2);
    mapfile->map(lay->oiwtab, oiwtabn * head.outn * 2);

int *oiwtab = new int[oiwtabn * head.outn * 2], *p = oiwtab;
    for (unsigned int outi = 0; outi < head.outn; ++outi) {
      for (int i = 0; i < oiwtabn; ++i, p += 2) {
        assert(outi_to_ini_wi(&head, outi, i, p + 0, p + 1));
      } int tmp0, tmp1;
      assert(!outi_to_ini_wi(&head, outi, oiwtabn, &tmp0, &tmp1));
    }
    encude(oiwtab, oiwtabn * head.outn * 2, lay->oiwtab);
    delete[] oiwtab;
  }

{
    unsigned int iowtabn = get_iowtabn(&head);
    cumake(&lay->iowtab, iowtabn * head.inn * 2);
    mapfile->map(lay->iowtab, iowtabn * head.inn * 2);

int *iowtab = new int[iowtabn * head.inn * 2], *p = iowtab;
    for (unsigned int ini = 0; ini < head.inn; ++ini) {
      for (int i = 0; i < iowtabn; ++i, p += 2) {
```

```
      assert(ini_to_outi_wi(&head, ini, i, p + 0, p + 1));
    } int tmp0, tmp1;
    assert(!ini_to_outi_wi(&head, ini, iowtabn, &tmp0, &tmp1));
  }
  encude(iowtab, iowtabn * head.inn * 2, lay->iowtab);
  delete[] iowtab;
}

{
  unsigned int wiotabn = get_wiotabn(&head);
  cumake(&lay->wiotab, wiotabn * head.wn * 2);
  mapfile->map(lay->wiotab, wiotabn * head.wn * 2);

int *wiotab = new int[wiotabn * head.wn * 2], *p = wiotab;
  for (unsigned int wi = 0; wi < head.wn; ++wi) {
    for (int i = 0; i < wiotabn; ++i, p += 2) {
      assert(wi_to_ini_outi(&head, wi, i, p + 0, p + 1));
    } int tmp0, tmp1;
    assert(!wi_to_ini_outi(&head, wi, wiotabn, &tmp0, &tmp1));
  }
  encude(wiotab, wiotabn * head.wn * 2, lay->wiotab);
  delete[] wiotab;
}
endif layers.push_back(lay);

if (layers.size() == 1)
    inn = lay->inn;
  outn = lay->outn;
} void Supertron::randomize(double disp) {
  for (auto lay : layers) {
```

```
Supertron::Layer::Head head;
decude(lay->head, 1, &head);

unsigned int s = get_oiwtabn(&head);
double f = disp / sqrt((double)s);
double *weight = new double[lay->wn];

switch (head.type) {
case Supertron::Layer::TYPE_FULL:
case Supertron::Layer::TYPE_LOCAL:
  for (unsigned int outi = 0; outi < head.outn; ++outi) { double sw = 0;
    int ini, wi;
    for (int i = 0; i < s; ++i) {
      outi_to_ini_wi(&head, outi, i, &ini, &wi);
      if (ini != -1) {
        weight[wi] = randgauss() * f;
        sw += weight[wi];
      }
    }
    for (int i = 0; i < s; ++i) {
      outi_to_ini_wi(&head, outi, i, &ini, &wi);
      if (ini == -1 && wi != -1) {
        weight[wi] = -sw/2.0;
        break;
      }
    }
  }
  break;

default:
  for (unsigned int wi = 0; wi < lay->wn; ++wi)
    weight[wi] = randgauss() * f;
  break;
} encude(weight, lay->wn, lay->weight);
```

```
      delete[] weight;
  }
}

} if MAIN
using namespace makemore;

int main() {
  Mapfile mapfile("foos.map");
  Supertron s(&mapfile);

fprintf(stderr, "%lu\n", s.layers.size());
for (auto lay : s.layers) {
  Supertron::Layer::Head head;
  decude(lay->head, 1, &head);
  fprintf(stderr, "%u %u %u\n", head.inn, head.outn, head.wn);
} if 1
double *cuin;
cumake(&cuin, 256);
double *in = new double[256];
double *out = new double[256];

while (1) {
  for (int j = 0;j < 256; ++j) {
    in[j] = randrange(0, 1);
  } encude(in, 256, cuin);
  decude(s.feed(cuin), 256, out);

s.target(cuin);
  s.update_stats();
  s.train(0.0001);
```

```
  if (s.rounds % 500 == 0) {
    for (unsigned int k = 0; k < 5; ++k)
      fprintf(stderr, "%lf\t", out[k]);
    fprintf(stderr, "\n");
    fprintf(stderr, "err2=%lf\n", s.err2);

s.mapfile->save();
  }
} else
  s.add_layer(Supertron::Layer::TYPE_YCONV,
    16, 16, 1,
    32, 32, 1,
    1, 1, true
  );

s.add_layer(Supertron::Layer::TYPE_YCONV,
    32, 32, 1,
    16, 16, 1,
    1, -1, false
  );

s.randomize(1.0);
  s.mapfile->save();
#endif
  return 0;
}
endif
```

Below is an additional partial example of computer-implemented code representing at least one implementation of the neural network of the invention.

```
#ifndef _MAKEMORE_SUPERTRON_HH_
#define _MAKEMORE_SUPERTRON_HH_ 1
#include <stdint.h>
#include <stdio.h>
#include <stdlib.h>
#include <assert.h>
#include <vector>
#include "mapfile.hh"
namespace makemore {
struct Supertron {
  class Mapfile *mapfile;
  double err2, errm, errdecay;
  unsigned int rounds;
  unsigned int inn, outn;
  struct Layer {
    Layer( ) {
      head = NULL;
      in = NULL;
      fin = NULL;
      out = NULL;
      fout = NULL;
      weight = NULL;
      wbuf = NULL;
      wbufk = 0;
      m = NULL;
      v = NULL;
      wn = 0;
      inn = 0;
      outn = 0;
      oiwtab = NULL;
      iowtab = NULL;
      wiotab = NULL;
    }
    ~Layer( ) {
    }
    Layer(const Layer &l) {
      head = l.head;
      in = l.in;
      fin = l.fin;
      out = l.out;
      fout = l.fout;
      weight = l.weight;
      wbuf = l.wbuf;
      wbufk = l.wbufk;
      m = l.m;
      V = l.v;
      wn = l.wn;
      inn = l.inn;
      outn = l.outn;
      oiwtab = l.oiwtab;
      iowtab = l.iowtab;
      wiotab = l.wiotab;
    }
    enum Type {
      TYPE_FULL = 0,
      TYPE_LOCAL = 1,
      TYPE_CONV = 2,
      TYPE_YCONV = 3,
      TYPE_MPOOL = 4,
      TYPE_IDENTITY = 5
    };
    enum Activation {
      ACTIVATION_NONE = 0,
      ACTIVATION_SIGMOID = 1,
      ACTIVATION_RELU = 2,
      ACTIVATION_SOFTPLUS = 3
    };
    struct Head {
      Layer::Type type;
      unsigned int wn, inn, outn;
      unsigned int iw, ih, ic;
      unsigned int ow, oh, oc;
      unsigned int d;
      int s;
      bool adam;
      double adam_b1, adam_b2, adam_b3, adam_eps, eta;
      int8_t activated;
    };
    Head *head;
    const double *in;
    double *fin, *out, *fout;
    double *weight, *m, *v;
    double *wbuf;
    unsigned int wbufk;
    unsigned int wn, inn, outn;
    int *oiwtab, *iowtab, *wiotab;
  };
  uint64_t *cunlayers;
  std::vector<Layer*> layers;
  Layer *first_layer, *last_layer;
  Supertron(class Mapfile * _mapfile);
  ~Supertron( );
  const double *feed(const double *_in, double *_fin = NULL);
  void train(double r);
  void target(const double *_tgt);
  void update_stats( );
  const double *input( ) { assert(layers.size( )); return layers[0]->in;
  }
  const double *output( ) { assert(layers.size( )); return
layers[layers.size( ) - 1]->out; }
  double *foutput( ) { assert(layers.size( )); return
layers[layers.size( ) - 1]->fout; }
  void randomize(double disp);
  void add_layer(const Layer::Head &head);
  void add_layer(
    Layer::Type type,
    unsigned int iw, unsigned int ih, unsigned int ic,
    unsigned int ow, unsigned int oh, unsigned int oc,
    unsigned int d, int s,
    Layer::Activation activated
  );
};
}
endif
```

Below is a partial example of computer-implemented code representing at least one implementation of the encoder class configuration of the invention.

```
#define _MAKEMORE_SUPERENC_CC_ 1
#include <string>
#include <algorithm>
#include "cudamem.hh"
#include "tron.hh"
#include "multitron.hh"
#include "superenc.hh"
#include "parson.hh"
#include "strutils.hh"
#include "imgutils.hh"
#include "supergen.hh"
namespace makemore {
using namespace std;
Superenc::Superenc(const std::string &_dir, unsigned int _mbn) :
Project(_dir, _mbn) {
  assert(mbn > 0);
  assert(config["type"] == "superenc");
  char ctrlayfn[4096];
  sprintf(ctrlayfn, "%s/control.lay", dir.c_str( ));
  ctrlay = new Layout;
  ctrlay->load_file(ctrlayfn);
  char inplayfn[4096];
  sprintf(inplayfn, "%s/input.lay", dir.c_str( ));
  inplay = new Layout;
  inplay->load_file(inplayfn);
  char encmapfn[4096];
  sprintf(encmapfn, "%s/enc.map", dir.c_str( ));
  encmap = new Mapfile(encmapfn);
  enc = new Supertron(encmap);
  encinlay = new Layout(*inplay);
  assert(enc->inn == mbn * encinlay->n);
  assert(enc->outn == mbn * ctrlay->n);
```

```
  cumake(&cuencin, enc->inn);
  ctrbuf = new double[mbn * ctrlay->n]( );
  inpbuf = new double[mbn * inplay->n]( );
  rounds = 0;
}
Superenc::~Superenc( ) {
  delete encinlay;
  delete inplay;
  delete ctrlay;
  cufree(cuencin);
  delete[ ] ctrbuf;
  delete[ ] inpbuf;
}
void Superenc::report(const char *prog) {
  fprintf(
    stderr,
    "%s %s rounds=%u enc_err2=%g enc_errm=%g\n",
    prog, dir.c_str( ), rounds, enc->err2, enc->errm
  );
}
void Superenc::save( ) {
  encmap->save( );
}
void Superenc::load( ) {
  encmap->load( );
}
void Superenc::encode(const Partrait &prt, double *ctr) {
  assert(mbn == 1);
  assert(encinlay->n == inplay->n);
  assert(inplay->n == prt.w * prt.h * 3);
  rgblab(prt.rgb, inplay->n, inpbuf);
  encude( inpbuf, inplay->n, cuencin);
  const double *cuencout = enc->feed(cuencin, NULL);
  assert(enc->outn == ctrlay->n);
  decude(cuencout, enc->outn, ctr);
}
void Superenc::burn(const class Supergen &gen, double nu) {
  assert(gen.ctrlay->n == ctrlay->n);
if (0) {
double foo[1024];
decude(gen.cugenfin, 1024, foo);
for (unsigned int j = 0; j < 16; ++j)
fprintf(stderr,"%lf\t", foo[j]);
fprintf(stderr,"\n");
}
  cucopy(gen.cugenfin +gen.ctxlay->n, gen.ctrlay->n, enc->foutput( ));
  enc->update_stats( );
  enc->train(nu);
}
#if 0
  assert(geninlay->n == ctxlay->n + ctrlay->n);
  assert(encinlay->n == inplay->n);
  for (unsigned int mbi = 0; mbi < mbn; ++mbi) {
    encude(ctxbuf + mbi * ctxlay->n, ctxlay->n, cugenin + mbi * geninlay->n);
    encude(inpbuf + mbi * inplay->n, inplay->n, cuencin + mbi * encinlay->n);
  }
  const double *cuencout = enc->feed(cuencin, NULL);
  for (unsigned int mbi = 0; mbi < mbn; ++mbi) {
    cucopy(cuencout + mbi * ctrlay->n, ctrlay->n, cugenin + mbi * geninlay->n + ctxlay->n);
  }
  cuzero(cugenfin, mbn * geninlay->n);
  gen->feed(cugenin, cugenfin);
  assert(gen->outn == mbn * inplay->n);
  encude(inpbuf, gen->outn, cugeninp);
  gen->target(cugeninp, false);
  if (focus) {
    double *cugenfout = gen->foutput( );
    for (unsigned int mbi = 0; mbi < mbn; ++mbi)
      cufocus(cugenfout + mbi * inplay->n, cuinplayx, cuinplayy, inplay->n);
  }
  gen->update_stats( );
  gen->train(pi);
  if (nu > 0) {
    double *cuencfoutput = enc->foutput( );
    for (unsigned int mbi = 0; mbi < mbn; ++mbi) {
      cucopy(cugenfin + mbi * geninlay->n + ctxlay->n, ctrlay->n, cuencfoutput + mbi * ctrlay->n);
    }
    enc->update_stats( );
    enc->train(nu);
  }
endif
}
```

Below is an additional partial example of computer-implemented code representing at least one implementation of the encoder class configuration of the invention.

```
#ifndef _MAKEMORE_SUPERENC_HH_
#define _MAKEMORE_SUPERENC_HH_ 1
#include "layout.hh"
#include "multitron.hh"
#include "project.hh"
#include "parson.hh"
#include "mapfile.hh"
#include "partrait.hh"
#include "cholo.hh"
#include "styler.hh"
#include "supertron.hh"
#include <vector>
#include <string>
#include <map>
namespace makemore {
struct Superenc : Project {
  bool ctract;
  Layout *inplay, *ctrlay;
  Layout *encinlay;
  Mapfile *encmap;
  Supertron *enc;
  double *cuencin, *cuencinp;
  double *ctrbuf, *inpbuf;
  unsigned int rounds;
  Superenc(const std::string &_dir, unsigned int _mbn);
  ~Superenc( );
  void report(const char *prog);
  void load( );
  void save( );
  void encode(const Partrait &prt, double *ctr);
  void burn(const class Supergen &gen, double nu);
};
}
endif
```

Below is a partial example of computer-implemented code representing at least one implementation of the generator class configuration of the invention.

```
#ifndef _MAKEMORE_SUPERENC_HH_
#define _MAKEMORE_SUPERENC_HH_ 1
#include "layout.hh"
#include "multitron.hh"
#include "project.hh"
#include "parson.hh"
#include "mapfile.hh"
#include "partrait.hh"
#include "cholo.hh"
#include "styler.hh"
#include "supertron.hh"
#include <vector>
#include <string>
#include <map>
namespace makemore {
struct Superenc : Project {
  bool ctract;
  Layout *inplay, *ctrlay;
  Layout *encinlay;
  Mapfile *encmap;
```

```
            Supertron *enc;
            double *cuencin, *cuencinp;
            double *ctrbuf, *inpbuf;
            unsigned int rounds;
            Superenc(const std::string &_dir, unsigned int _mbn);
            ~Superenc( );
            void report(const char *prog);
            void load( );
            void save( );
            void encode(const Partrait &prt, double *ctr);
            void burn(const class Supergen &gen, double nu);
    };
    }
    #endif
```

Below is an additional partial example of computer-implemented code representing at least one implementation of the generator class configuration of the invention.

```
#ifndef _MAKEMORE_SUPERGEN_HH_
#define _MAKEMORE_SUPERGEN_HH_ 1
#include "layout.hh"
#include "multitron.hh"
#include "vocab.hh"
#include "project.hh"
#include "script.hh"
#include "convo.hh"
#include "parson.hh"
#include "mapfile.hh"
#include "styler.hh"
#include "zone.hh"
#include "supertron.hh"
#include <vector>
#include <string>
#include <map>
namespace makemore {
struct Supergen : Project {
        bool ctract;
        bool focus;
        bool is_rgb;
        int ctxtype;
        Layout *tgtlay, *ctrlay, *ctxlay;
        Layout *geninlay;
        Mapfile *genmap;
        Supertron *gen;
        Zone *zone;
        double *cugenin, *cugentgt, *cugenfin;
        double *ctxbuf, *ctrbuf, *tgtbuf, *buf;
        double *cutgtlayx, *cutgtlayy;
        unsigned int rounds;
        Supergen(const std::string &_dir, unsigned int _mbn = 1);
        ~Supergen( );
        void report(const char *prog);
        void load( );
        void save( );
        void scramble(double dev = 1.0);
        void generate(const double *ctr, class Partrait *prt, class Styler *sty
=       NULL, bool bp = false);
        void burn(const class Partrait &prt, double pi);
        void burn(const class Partrait &prt, double pi, class Superdis *dis);
};
}
endif
```

Below is a partial example of computer-implemented code representing at least one implementation of the discriminator class configuration of the invention.

```
    #define _MAKEMORE _SUPERDIS_CC_ 1
    #include <string>
    #include <algorithm>
    #include "cudamem.hh"
    #include "tron.hh"
    #include "multitron.hh"
    #include "superdis.hh"
    #include "parson.hh"
    #include "strutils.hh"
    #include "imgutils.hh"
    #include "supergen.hh"
    #include "superenc.hh"
    namespace makemore {
    using namespace std;
    Superdis::Superdis(const std::string &_dir, unsigned int _mbn) :
    Project(_dir, _mbn) {
        assert(mbn > 0);
        assert(config["type"] == "superdis");
        char inplayfn[4096];
        sprintf(inplayfn, "%s/input.lay", dir.c_str( ));
        inplay = new Layout;
        inplay->load_file(inplayfn);
    #if 0
        char clsmapfn[4096];
        sprintf(clsmapfn, "%s/cls.map", dir.c_str( ));
        clsmap = new Mapfile(clsmapfn);
        cls = new Supertron(clsmap);
    #endif
        char dismapfn[4096];
        sprintf(dismapfn, "%s/dis.map", dir.c_str( ));
        dismap = new Mapfile(dismapfn);
        dis = new Supertron(dismap);
    #if 0
        assert(cls->inn == inplay->n);
        assert(cls->outn == dis->inn);
    #else
        assert(dis->inn == inplay->n);
    #endif
        assert(dis->outn == 1);
    #if 0
        cumake(&cuclsin, cls->inn);
        cumake(&cuclstgt, cls->outn);
    #endif
        cumake(&cudisin, dis->inn);
        cumake(&cudistgt, 1);
        inpbuf = new double[mbn * inplay->n]( );
        rounds = 0;
    }
    Superdis::~Superdis( ) {
        delete inplay;
        cufree(cudisin);
    #if 0
        cufree(cuclsin);
        cufree(cuclstgt);
    #endif
        cufree(cudistgt);
        delete[ ] inpbuf;
    }
    void Superdis::report(const char *prog) {
        fprintf(
            stderr,
    #if 0
            "%s %s rounds=%u cls_err2=%g cls_errm=%g\n"
    #endif
            "%s %s rounds=%u dis_err2=%g dis_errm=%g\n",
    #if 0
            prog, dir.c_str( ), rounds,
            cls->err2, cls->errm,
    #endif
            prog, dir.c str( ), rounds,
            dis->err2, dis->errm
        );
    }
    void Superdis::save( ) {
        //clsmap->save( );
        dismap->save( );
    }
    void Superdis::load( ) {
        //clsmap->load( );
        dismap->load( );
    }
    double Superdis::score(const class Partrait &prt) {
        assert(mbn == 1);
        assert(inplay->n == prt.w * prt.h * 3);
        rgblab(prt.rgb, inplay->n, inpbuf);
```

```
        double d = 0.5 / 256.0;
        for (unsigned int j = 0; j < inplay->n; ++j)
            inpbuf[j] += randrange(-d, d);
#if 0
        encude( inpbuf, inplay->n, cuclsin);
        const double *cuclsout = cls->feed(cuclsin, NULL);
        const double *cudisout = dis->feed(cuclsout, cls->foutput( ));
#endif
        encude( inpbuf, inplay->n, cudisin);
        const double *cudisout = dis->feed(cudisin);
        double sc;
        decude(cudisout, 1, &sc);
        return sc;
    }
#if 0
    void Superdis::classify(const class Partrait &prt, double *clsbuf) {
        assert(mbn == 1);
        assert(inplay->n == prt.w * prt.h * 3);
        rgblab(prt.rgb, inplay->n, inpbuf);
        double d = 0.5 / 256.0;
        for (unsigned int j = 0; j < inplay->n; ++j)
            inpbuf[j] += randrange(-d, d);
        encude( inpbuf, inplay->n, cuclsin);
        const double *cuclsout = cls->feed(cuclsin, NULL);
        decude(cuclsout, cls->outn, clsbuf);
    }
endif
    double Superdis::score(const class Supergen *gen) {
        assert(mbn == 1);
        assert(gen->tgtlay->n == inplay->n);
#if 0
        const double *cuclsout = cls->feed(gen->gen->output( ), gen->gen->foutput( ));
        const double *cudisout = dis->feed(cls->output( ), cls->foutput( ));
#endif
        const double *cudisout = dis->feed(gen->gen->output( ), gen->gen->foutput( ));
        double sc;
        decude(cudisout, 1, &sc);
        return sc;
    }
    void Superdis::burn(double sc, double nu) {
//      double osc;
//      decude(dis->output( ), 1, &osc);
//      double dsc = (sc - sigmoid(osc));
//      encude(&dsc, 1, dis->foutput( ));
        encude(&sc, 1, cudistgt);
        dis->target(cudistgt);
        if (nu > 0)
            dis->update_stats( );
        dis->train(nu);
//      if (nu > 0)
//          cls->update_stats( );
//      cls->train(nu);
    }
    void Superdis::observe(const Partrait *prt0, Superenc *enc, Supergen
*gen, const Partrait *prt1, double nu) {
        double *ctr;
        cumake(&ctr, enc->ctrlay->n);
        enc->encode(*prt0, ctr);
        gen->generate(ctr, NULL);
        cufree(ctr);
        double sc0 = score(gen);
        burn(0.0, nu);
        double sc1 = score(*prt1);
        burn(1.0, nu);
//fprintf(stderr, "(%lf,%1f)\n", sc0, sc1);
    }
}
```

Below is an additional partial example of computer-implemented code representing at least one implementation of the discriminator class configuration of the invention.

```
#ifndef _MAKEMORE_SUPERDIS_HH_
#define _MAKEMORE_SUPERDIS_HH_ 1
#include "layout.hh"
#include "multitron.hh"
#include "project.hh"
#include "parson.hh"
#include "mapfile.hh"
#include "partrait.hh"
#include "cholo.hh"
#include "styler.hh"
#include "supertron.hh"
#include <vector>
#include <string>
#include <map>
namespace makemore {
struct Superdis : Project {
    Layout *inplay;
    Mapfile *dismap;
//  Mapfile *clsmap;
//  Supertron *cls;
    Supertron *dis;
//  double *cuclsin, *cuclstgt;
    double *cudisin, *cudistgt;
    double *inpbuf;
    unsigned int rounds;
    Superdis(const std::string &_dir, unsigned int _mbn);
    ~Superdis( );
    void report(const char *prog);
    void load( );
    void save( );
    double score(const class Supergen *gen);
    double score(const class Partrait &prt);
//  void classify(const class Partrait &prt, double *clsbuf);
    void burn(double sc, double nu);
    void observe(const class Partrait *prt0, class Superenc *enc, class
Supergen *gen, const class Partrait *prt1, double nu);
};
}
endif
```

Below is a partial example of computer-implemented code representing at least one implementation of the autoposer class configuration of the invention.

```
#define _MAKEMORE_AUTOPOSER_CC_ 1
#include <netinet/in.h>
#include <string>
#include <algorithm>
#include "cudamem.hh"
#include "tron.hh"
#include "multitron.hh"
#include "twiddle.hh"
#include "closest.hh"
#include "shibboleth.hh"
#include "shibbomore.hh"
#include "convo.hh"
#include "parson.hh"
#include "strutils.hh"
#include "cholo.hh"
#include "normatron.hh"
#include "autoposer.hh"
#include "partrait.hh"
namespace makemore {
using namespace std;
static string read_word(FILE *fp, char sep) {
    int c = getc(fp);
    if (c == EOF)
        return " ";
    char buf[2];
    buf[0] = (char)c;
    buf[1] = 0;
    string word(buf);
    while (1) {
        c = getc(fp);
        if (c == EOF)
            return " ";
        if (c == sep)
            break;
```

```
    buf[0] = (char)c;
    word += buf;
  }
  return word;
}
Autoposer::Autoposer(const std: :string &_dir) : Project(_dir, 1) {
  assert(mbn == 1);
  assert(config["type"] == "autoposer");
  char segoutlayfn[4096];
  sprintf(segoutlayfn, "%s/segoutput.lay", dir.c_str( ));
  segoutlay = new Layout;
  segoutlay->load_file(segoutlayfn);
  char seginlayfn[4096];
  sprintf(seginlayfn, "%s/seginput.lay", dir.c_str( ));
  seginlay = new Layout;
  seginlay->load_file(seginlayfn);
  char segmapfn[4096], segtopfn[4096];
  sprintf(segtopfn, "%s/seg.top", dir.c_str( ));
  sprintf(segmapfn, "%s/seg.map", dir.c_str( ));
  segtop = new Topology;
  segtop->load_file(segtopfn);
  segmap = new Mapfile(segmapfn);
  seg = new Multitron(*segtop, segmap, mbn, false);
  char resegmapfn[4096];
  sprintf(resegmapfn, "%s/reseg.map", dir.c_str( ));
  resegmap = new Mapfile(resegmapfn);
  reseg = new Multitron(*segtop, resegmap, mbn, false);
  assert(seg->outn == segoutlay->n);
  assert(segoutlay->n == 6);
  cumake(&cusegtgt, seg->outn);
  cumake(&cusegin, seg->inn);
  rounds = 0;
}
Autoposer::~Autoposer( ) {
  delete seg;
  delete segmap;
  delete segtop;
  delete seginlay;
  delete segoutlay;
  cufree(cusegin);
  cufree(cusegtgt);
}
void Autoposer::report(const char *prog) {
  fprintf(
    stderr,
    "%s %s rounds=%u\n"
    "%s %s seg_err2=%g seg_errm=%g\n"
    "%s %s reseg_err2=%g reseg_errm=%g\n"
    "\n",
    prog, dir.c_str( ), rounds,
    prog, dir.c_str( ), seg->err2, seg->errm,
    prog, dir.c_str( ), reseg->err2, reseg->errm
  );
}
void Autoposer::save( ) {
  segmap->save( );
}
void Autoposer::load( ) {
  segmap->load( );
}
void Autoposer::observe(const Partrait &par, double mu) {
  assert(par.has_mark( ));
  Triangle mark = par.get_mark( );
  assert(seg->inn == par.w * par.h * 3);
  par.encudub(cusegin);
  seg->feed(cusegin, NULL);
  mark.p.x /= (double)par.w;
  mark.p.y /= (double)par.h;
  mark.q.x /= (double)par.w;
  mark.q.y /= (double)par.h;
  mark.r.x /= (double)par.w;
  mark.r.y /= (double)par.h;
  assert(seg->outn == 6);
  assert(sizeof(mark) == 6 * sizeof(double));
  encude((double *)&mark, 6, cusegtgt);
  seg->target(cusegtgt);
  seg->train(mu);
}
void Autoposer::reobserve(const Partrait &par, double mu) {
  assert(par.has_mark( ));
  Triangle mark = par.get_mark( );
  assert(reseg->inn == par.w * par.h * 3);
  par.encudub(cusegin);
  reseg->feed(cusegin, NULL);
  mark.p.x /= (double)par.w;
  mark.p.y /= (double)par.h;
  mark.q.x /= (double)par.w;
  mark.q.y /= (double)par.h;
  mark.r.x /= (double)par.w;
  mark.r.y /= (double)par.h;
  assert(reseg->outn == 6);
  assert(sizeof(mark) == 6 * sizeof(double));
  encude((double *)&mark, 6, cusegtgt);
  reseg->target(cusegtgt);
  reseg->train(mu);
}
void Autoposer::autopose(Partrait *parp) {
  assert(parp->has_mark( ));
  assert(seginlay->n == 256 * 256 * 3);
  Partrait x(256, 256);
  x.set_pose(Pose::STANDARD);
  parp->warp(&x);
  x.encudub(cusegin);
  const double *cusegout = seg->feed(cusegin, NULL);
  Triangle xmark;
  decude(cusegout, 6, (double *)&xmark);
  xmark.p.x *= 256.0;
  xmark.p.y *= 256.0;
  xmark.q.x *= 256.0;
  xmark.q.y *= 256.0;
  xmark.r.x *= 256.0;
  xmark.r.y *= 256.0;
//fprintf(stderr, "xmark=(%lf,%lf) (%lf,%lf) (%lf,%lf)\n", xmark.p.x,
xmark.p.y, xmark.q.x, xmark.q.y, xmark.r.x, xmark.r.y);
  Triangle pmark = parp->get_mark( );
  Triangle qmark = x.get_mark( );
  xmark.p = makemore::trimap(xmark.p, qmark, pmark);
  xmark.q = makemore::trimap(xmark.q, qmark, pmark);
  xmark.r = makemore::trimap(xmark.r, qmark, pmark);
  parp->set_mark(xmark);
}
```

Below is an additional partial example of computer-implemented code representing at least one implementation of the autoposer class configuration of the invention.

```
#ifndef __MAKEMORE_AUTOPOSER_HH__
#define __MAKEMORE_AUTOPOSER_HH__ 1
#include "layout.hh"
#include "topology.hh"
#include "multitron.hh"
#include "vocab.hh"
#include "project.hh"
#include "script.hh"
#include "convo.hh"
#include "parson.hh"
#include "mapfile.hh"
#include "cholo.hh"
#include <vector>
#include <string>
#include <map>
namespace makemore {
struct Autoposer : Project {
  Layout *seginlay, *segoutlay;
  Topology *segtop;
  Mapfile *segmap, *resegmap;
  Tron *seg, *reseg;
  double *cusegtgt, *cusegin;
  unsigned int rounds;
  Autoposer(const std: :string &_dir);
  ~Autoposer( );
  void report(const char *prog);
```

```
        void load( );
        void save( );
        void observe(const class Partrait &par, double mu);
        void reobserve(const class Partrait &par, double mu);
        void autopose(class Partrait *parp);
    };
}
endif
```

Below is a partial example of computer-implemented code representing at least one implementation of the automasker class configuration of the invention.

```
#define __MAKEMORE_AUTOMASKER_CC__ 1
#include <netinet/in.h>
#include <string>
#include <algorithm>
#include "cudamem.hh"
#include "tron.hh"
#include "multitron.hh"
#include "twiddle.hh"
#include "closest.hh"
#include "shibboleth.hh"
#include "shibbomore.hh"
#include "convo.hh"
#include "parson.hh"
#include "strutils.hh"
#include "cholo.hh"
#include "normatron.hh"
#include "automasker.hh"
#include "partrait.hh"
#include "numutils.hh"
namespace makemore {
using namespace std;
Automasker::Automasker(const std::string & dir) : Project(_dir, 1) {
    assert(mbn == 1);
    assert(config["type"] == "automasker");
    char mskoutlayfn[4096];
    sprintf(mskoutlayfn, "%s/mskoutput.lay", dir.c_str( ));
    mskoutlay = new Layout;
    mskoutlay->load_file(mskoutlayfn);
    char mskinlayfn[4096];
    sprintf(mskinlayfn, "%s/mskinput.lay", dir.c_str( ));
    mskinlay = new Layout;
    mskinlay->load_file(mskinlayfn);
    char mskmapfn[4096], msktopfn[4096];
    sprintf(msktopfn, "%s/msk.top", dir.c_str( ));
    sprintf(mskmapfn, "%s/msk.map", dir.c_str( ));
    msktop = new Topology;
    msktop->load_file(msktopfn);
    mskmap = new Mapfile(mskmapfn);
    msk = new Multitron(*msktop, mskmap, mbn, false);
    assert(msk->outn == mskoutlay->n);
    assert(mskoutlay->n * 3 == mskinlay->n);
    cumake(&cumsktgt, msk->outn);
    cumake(&cumskin, msk->inn);
    tgtbuf = new double[msk->inn];
    rounds = 0;
}
Automasker::~Automasker( ) {
    delete msk;
    delete mskmap;
    delete msktop;
    delete mskinlay;
    delete mskoutlay;
    delete[ ] tgtbuf;
    cufree(cumskin);
    cufree(cumsktgt);
}
void Automasker::report(const char *prog) {
    fprintf(
        stderr,
        "%s %s rounds=%u\n"
        "%s %s msk_err2=%g msk_errm=%g\n"
        "\n",
        prog, dir.c_str( ), rounds,
        prog, dir.c_str( ), msk->err2, msk->errm
```

```
    };
}
void Automasker::save( ) {
    mskmap->save( );
}
void Automasker::load( ) {
    mskmap->load( );
}
void Automasker::observe(const Partrait &prt, double mu) {
    assert(mbn == 1);
    assert(msk->inn == prt.w * prt.h * 3);
    assert(msk->outn == prt.w * prt.h);
    assert(prt.rgb);
    assert(prt.alpha);
    btodv(prt.rgb, tgtbuf, msk->inn);
    encude(tgtbuf, msk->inn, cumskin);
    msk->feed(cumskin, NULL);
    btodv(prt.alpha, tgtbuf, msk->outn);
    encude(tgtbuf, msk->outn, cumsktgt);
    msk->target(cumsktgt, false);
    msk->update_stats( );
    msk->train(mu);
}
void Automasker::automask(Partrait *prt) {
    assert(mbn == 1);
    assert(msk->inn == prt->w * prt->h * 3);
    assert(msk->inn == msk->outn * 3);
    btodv(prt->rgb, tgtbuf, msk->inn);
    encude(tgtbuf, msk->inn, cumskin);
    const double *cumskout = msk->feed(cumskin, NULL);
    decude(cumskout, msk->outn, tgtbuf);
    if (!prt->alpha)
        prt->alpha = new uint8_t[prt->w * prt->h];
    dtobv(tgtbuf, prt->alpha, msk->outn) ;
}
}
```

Below is an additional partial example of computer-implemented code representing at least one implementation of the automasker class configuration of the invention.

```
#ifndef __MAKEMORE_AUTOMASKER_HH
#define __MAKEMORE_AUTOMASKER_HH__ 1
#include "layout.hh"
#include "topology.hh"
#include "multitron.hh"
#include "vocab.hh"
#include "project.hh"
#include "script.hh"
#include "convo.hh"
#include "parson.hh"
#include "mapfile.hh"
#include "cholo.hh"
#include <vector>
#include <string>
#include <map>
namespace makemore {
struct Automasker : Project {
    Layout *mskinlay, *mskoutlay;
    Topology *msktop;
    Mapfile *mskmap;
    Tron *msk;
    double *tgtbuf;
    double *cumsktgt, *cumskin;
    unsigned int rounds;
    Automasker(const std :: string &_dir);
    ~Automasker( );
    void report(const char *prog);
    void load( );
    void save( );
    void observe(const class Partrait &prt, double mu);
    void automask(class Partrait *prtp);
};
}
endif
```

Below is a partial example of computer-implemented code representing at least one implementation of the encoder of the invention.

```
#!/bin/bash
LAYOUTS = input.lay control.lay
MAPFILES = enc.map
BINDIR = ..
all: $(LAYOUTS) $(MAPFILES)
encinput.lay: input, lay
        $(BINDIR)/catlay $^ > $@
encoutput.lay: control.lay
        $(BINDIR)/catlay $^ > $@
enc.map:
        $(BINDIR)/maketron --new $@
        $(BINDIR)/maketron --add $@ 1 256 256 3 256 256 4 1   0 1
        $(BINDIR)/maketron --add $@ 1 256 256 4 128 128 4 1 -1 1
        $(BINDIR)/maketron --add $@ 1 128 128 4   64  64 4 2 -1 1
        $(BINDIR)/maketron --add $@ 1  64  64 4   32  32 4 3 -1 1
        $(BINDIR)/maketron --add $@ 0  32  32 4   16  16 4 0  0 1
        $(BINDIR)/maketron --randomize $@ 3
control.lay:
        $(BINDIR)/makelay -grid 16 1 4 > $@
input.lay:
        $(BINDIR)/makelay -grid 256 1 3 > $@
clean:
        rm -f *.lay *.wire *.top *.map
```

Below is a partial example of computer-implemented code representing at least one implementation of the generator of the invention.

```
#!/bin/bash
LAYOUTS = context.lay control.lay target.lay
TOPOLOGIES =
MAPFILES = gen.map
BINDIR = ..
all: $(DATASETS) $(LAYOUTS) $ (WIRINGS) $ (TOPOLOGIES) $ (MAPFILES)
geninput.lay: context. lay control. lay
        $(BINDIR)/catlay $^ > $@
genoutput.lay: target. lay
        $(BINDIR)/catlay $^ > $@
gen.map:
        $(BINDIR)/maketron --new $@
        $(BINDIR)/maketron --add $@ 0   16  16 4   32  32 4 0 0 1
        $(BINDIR)/maketron --add $@ 1   32  32 4   64  64 4 3 1 1
        $(BINDIR)/maketron --add $@ 1   64  64 4  128 128 4 2 1 1
        $(BINDIR)/maketron --add $@ 1  128 128 4  256 256 8 1 1 1
        $(BINDIR)/maketron --add $@ 2  256 256 8  256 256 8 1 0 1
        $(BINDIR)/maketron --add $@ 2  256 256 8  256 256 8 1 0 1
        $(BINDIR)/maketron --add $@ 2  256 256 8  256 256 3 1 0 0
        $(BINDIR)/maketron --randomize $@3
control. lay:
        $(BINDIR)/makelay -grid 16 1 4 > $@
context. lay:
        $(BINDIR)/makelay -center 0 16 > $@
target. lay:
        $(BINDIR)/makelay -grid 256 1 3 > $@
clean:
        rm -f *.lay *.wire *.top *.map
```

Below is a partial example of computer-implemented code representing at least one implementation of the discriminator of the invention.

```
#!/bin/bash
LAYOUTS = input.lay
MAPFILES = dis.map
BINDIR = ..
all: $(LAYOUTS) $(MAPFILES)
dis.map:
        $(BINDIR)/maketron --new $@
        $(BINDIR)/maketron --add $@ 2 256 256 3   256 256 8 1 0 3
        $(BINDIR)/maketron --add $@ 2 256 256 8   256 256 8 1 0 3
        $(BINDIR)/maketron --add $@ 4 256 256 8 128 128   8 0 -1 0
        $(BINDIR)/maketron --add $@ 2 128 128 8 128 128  16 1 0 3
        $(BINDIR)/maketron --add $@ 4 128 128 16 64 64  16 0 -1 0
        $(BINDIR)/maketron --add $@ 2  64    64 16 64 64 16 1 0 3
        $(BINDIR)/maketron --add $@ 4  64    64 16 32 32 16 0 -1 0
        $(BINDIR)/maketron --add $@ 2  32    32 16 32 32 16 1 0 3
        $(BINDIR)/maketron --add $@ 4  32    32 16 16 16 16 0 -1 0
        $(BINDIR)/maketron --add $@ 2  16    16 16 16 16 16 1 0 3
        $(BINDIR)/maketron --add $@ 4  16    16 16  8  8 16 0 -1 0
        $(BINDIR)/maketron --add $@ 1   8     8 16  8  8 16 1 0 3
        $(BINDIR)/maketron --add $@ 0   8     8 16  1  1 256 0 0 3
        $(BINDIR)/maketron --add $@ 0   1       1 256 1 1 128 0 0 3
        $(BINDIR)/maketron --add $@ 0   1       1 128 1 1 1 0 0 0
        $(BINDIR)/maketron --randomize $@ 2
input.lay:
        $(BINDIR)/makelay -grid 256 1 3 > $@
clean:
        rm -f *.lay *.wire *.top *.map
```

Below is a partial example of computer-implemented code representing at least one implementation of the invention.

```
#include <string>
#include "supertron.hh"
#include "random.hh"
using namespace makemore;
int usage( ) {
    fprintf(stderr, "Usage: maketron [--new file.map | ...]\n");
    return 1;
}
int main(int argc, char **argv) {
    seedrand( );
    --argc;
    ++argv;
    assert(argc > 0);
    std::string opt = argv[0];
    if (opt == "--new") {
        --argc;
        ++argv;
        assert(argc > 0);
        const char *mapfn = argv[0];
        FILE *mapfp;
        assert(mapfp = fopen(mapfn, "w"));
        Mapfile *mapfile = new Mapfile(mapfn);
        Supertron *st = new Supertron(mapfile);
        mapfile->save( );
        delete st;
        delete mapfile;
        fclose(mapfp);
        return 0;
    }
    if (opt == "--randomize") {
        --argc;
        ++argv;
        assert(argc > 0);
        const char *mapfn = argv[0];
        --argc;
        ++argv;
        double disp = argc > 0 ? strtod(argv[0], NULL) : 1.0;
        Mapfile *mapfile = new Mapfile(mapfn);
        Supertron *st = new Supertron(mapfile);
        st->randomize(disp);
        mapfile->save( );
        delete st;
        delete mapfile;
        return 0;
    }
    if (opt == "--add") {
        --argc;
        ++argv;
        assert(argc > 0);
        const char *mapfn = argv[0];
        --argc;
        ++argv;
        assert(argc == 10);
```

```
    Supertron::Layer::Type type = (Supertron::Layer::Type)atoi(argv[0]);
    int iw = atoi(argv[1]), ih = atoi(argv[2]), ic = atoi(argv[3]);
    int ow = atoi(argv[4]), oh = atoi(argv[5]), oc = atoi(argv[6]);
    int d = atoi(argv[7]), s = atoi(argv[8]);
    Supertron::Layer::Activation             a             =
(Supertron::Layer::Activation)atoi(argv[9]);
    Mapfile *mapfile = new Mapfile(mapfn);
    Supertron *st = new Supertron(mapfile);
    st->add_layer(type, iw, ih, ic, ow, oh, oc, d, s, a);
    mapfile->save( );
    delete st;
    delete mapfile;
    return 0;
  }
  return usage( );
}
```

Below is a partial example of computer-implemented code representing at least one implementation of the auto-masker of the invention.

```
#!/bin/bash
LAYOUTS = target.lay
TOPOLOGIES = msk.top
MAPFILES = msk.map
BINDIR = ..
all: $(DATASETS) $(LAYOUTS) $(WIRINGS) $(TOPOLOGIES) $(MAPFILES)
mskinput.lay: target.lay
    $(BINDIR)/catlay $^ > $@
mskhidden1.lay:
    $(BINDIR)/makelay -rand 65536 16 > $@
mskhidden2.lay:
    $(BINDIR)/makelay -rand 8192 32 > $@
mskhidden3.lay:
    $(BINDIR)/makelay -rand 65536 16 > $@
mskoutput.lay: target.lay
    $(BINDIR)/catlay $^ > $@
mskhidden1.wire: mskinput.lay mskhidden1.lay
    $(BINDIR)/wireup --minv 4 $^ > $@
mskhidden2.wire: mskhidden1.lay mskhidden2.lay
    $(BINDIR)/wireup --minv 4 $^ > $@
mskhidden3.wire: mskhidden2.lay mskhidden3.lay
    $(BINDIR)/wireup --minv 4 $^ > $@
mskoutput.wire: mskhidden3.lay mskoutput.lay
    $(BINDIR)/wireup --minv 4 $^ > $@
msk.top: mskhidden1.wire mskhidden2.wire mskhidden3.wire mskoutput.wire
    $(BINDIR)/maketop $^ > $@
msk.map: msk.top
    $(BINDIR)/makemap --dispersion 3 msk.top msk.map
target.lay:
    $(BINDIR)/makelay -grid 256 1 3 > $@
clean:
    rm -f *.lay *.wire *.top *.map
```

Below is a partial example of computer-implemented code representing at least one implementation of the auto-poser of the invention.

```
#!/bin/bash
LAYOUTS = seginput.lay segoutput.lay
TOPOLOGIES = seg.top
MAPFILES = seg.map
BINDIR = ..
all: $(DATASETS) $(LAYOUTS) $(TOPOLOGIES) $(MAPFILES)
seginput.lay:
    $(BINDIR)/makelay -grid 256 1 3 > $@
seghidden1.lay:
    $(BINDIR)/makelay -rand 32768 2 > $@
seghidden2.lay:
    $(BINDIR)/makelay -rand 4096 16 > $@
seghidden3.lay:
    $(BINDIR)/makelay -center 256 2 > $@
segoutput.lay:
    $(BINDIR)/makelay -center 6 2 > $@
seghidden1.wire: seginput.lay seghidden1.lay
    $(BINDIR)/wireup --minv 16 $^ > $@
seghidden2.wire: seghidden1.lay seghidden2.lay
    $(BINDIR)/wireup --minv 16 $^ > $@
seghidden3.wire: seghidden2.lay seghidden3.lay
    $(BINDIR)/wireup --minv 16 $^ > $@
segoutput.wire: seghidden3.lay segoutput.lay
    $(BINDIR)/wireup --minv 16 $^ > $@
seg.top: seghidden1.wire seghidden2.wire seghidden3.wire segoutput.wire
    $(BINDIR)/maketop $^ > $@
seg.map: seg.top
    $(BINDIR)/makemap --dispersion 3 seg.top seg.map
clean:
    rm -f *.lay *.wire *.top *.map
```

Those of ordinary skill in the art will understand and appreciate that the foregoing description of the invention has been made with reference to certain exemplary embodiments of the invention, which describe a system of neural networks configured for audio-visual simulation and generation. Those of skill in the art will understand that obvious variations in system configuration, protocols, parameters or properties may be made without departing from the scope of the invention which is intended to be limited only by the claims appended hereto.

What is claimed is:

1. A system for audio-visual simulation and generation, comprising:
    a. an autoposer neural network configured to receive an input image and to output landmark information for the image;
    b. an automasker neural network configured to receive an input image and use trained segmentation to map the input image onto a grayscale foreground mask or a background mask and output the result;
    c. an encoder neural network configured to receive an input image and output a control vector corresponding to the input image;
    d. a generator neural network configured to receive and generate an image based on an input control vector produced by the encoder, a reference image map, a set of hashable text tags, and a set of final pose parameters; and
    e. at least one training set, comprising a set of images and configured to train a neural network.

2. The system of claim 1, further comprising:
    a. an improver neural network configured to receive an input image from the generator and produce an altered image that has been modified based on a given loss function value; and
    b. a discriminator neural network configured to receive an input image and output a single channel loss function representing an overall quality value of the input image.

3. The system of claim 2, further comprising a styler, configured to generate control vectors based on a specific training set control vector.

4. The system of claim 3, wherein the styler is further configured to accept tags, resulting in implementation of a corresponding tag vector on the control vector.

5. The system of claim 4, wherein at least one of the at least one training set is generated by a neural network of the system.

6. The system of claim 5, wherein at least one training set generated by a neural network of the system is used to train a neural network of the system.

7. The system of claim 6, wherein the autoposer is configured to generate and capture a training set from a video, and the generated training set is used to train the generator.

8. The system of claim 7, wherein the generator and the encoder are configured to carry out compression of video, and the improver and the discriminator further configured to process a resulting generated video from the generator.

* * * * *